United States Patent
Daigle

(10) Patent No.: US 7,029,205 B2
(45) Date of Patent: Apr. 18, 2006

(54) APPARATUS FOR PIPELINE STABILIZATION AND SHORELINE EROSION PROTECTION

(76) Inventor: Richard A. Daigle, 306 Pamela Pl., Thibodaux, LA (US) 70301

( * ) Notice: Subject to any disclaimer, the term of this patent is extended or adjusted under 35 U.S.C. 154(b) by 20 days.

(21) Appl. No.: 10/300,991

(22) Filed: Nov. 21, 2002

(65) Prior Publication Data
US 2004/0101368 A1    May 27, 2004

(51) Int. Cl.
F16L 57/06    (2006.01)
F16L 1/24    (2006.01)
E02D 17/20    (2006.01)

(52) U.S. Cl. ............ 405/157; 405/18; 405/19; 405/172; 405/184.4; 405/302.6

(58) Field of Classification Search ......... 405/18, 405/19, 20, 302.4, 302.6, 302.7, 157, 172, 405/184.4; 138/105, 110
See application file for complete search history.

(56) References Cited

U.S. PATENT DOCUMENTS

| | | | | |
|---|---|---|---|---|
| 3,278,116 A | * | 10/1966 | Petty ............ | 138/110 |
| 3,374,635 A | * | 3/1968 | Crandall ............ | 405/18 |
| 3,474,626 A | * | 10/1969 | Colle ............ | 405/18 |
| 3,561,219 A | * | 2/1971 | Nishizawa et al. ............ | 405/19 |
| 3,696,623 A | * | 10/1972 | Heine et al. ............ | 405/19 |
| 3,793,845 A | * | 2/1974 | Keith ............ | 405/172 |
| 3,974,960 A | * | 8/1976 | Mitchell ............ | 383/37 |
| 4,102,137 A | * | 7/1978 | Porraz et al. ............ | 405/18 |
| 4,159,139 A | * | 6/1979 | Gawedzinski ............ | 15/257.1 |
| 4,184,788 A | * | 1/1980 | Colle ............ | 405/19 |
| 4,280,315 A | * | 7/1981 | Von Hapsburg ............ | 383/33 |
| 4,314,774 A | * | 2/1982 | Tsuji et al. ............ | 405/115 |
| 4,405,257 A | * | 9/1983 | Nielsen ............ | 405/19 |
| 4,477,206 A | * | 10/1984 | Papetti et al. ............ | 405/172 |
| 4,592,675 A | * | 6/1986 | Scales et al. ............ | 405/19 |
| 4,867,074 A | * | 9/1989 | Quasnick ............ | 108/51.3 |
| 4,889,446 A | * | 12/1989 | Holmberg ............ | 405/19 |
| 4,940,364 A | * | 7/1990 | Dlugosz ............ | 405/229 |
| 5,257,878 A | * | 11/1993 | Peterson ............ | 405/15 |
| 5,452,968 A | * | 9/1995 | Dlugosz ............ | 405/303 |
| 5,836,553 A | * | 11/1998 | Bergaila ............ | 248/99 |
| 5,988,227 A | * | 11/1999 | Magoffin ............ | 138/110 |
| 6,026,993 A | * | 2/2000 | Sperna Weiland ............ | 222/480 |
| 6,186,701 B1 | * | 2/2001 | Kempers ............ | 405/19 |
| 6,220,788 B1 | * | 4/2001 | Jewell ............ | 405/172 |
| 6,428,240 B1 | * | 8/2002 | Ehrlich et al. ............ | 405/114 |
| 6,598,374 B1 | * | 7/2003 | Ensor ............ | 383/37 |

OTHER PUBLICATIONS

Hawley's Condensed Chemical Dictionary, (eleventh edition); p. 942; 1987.*

* cited by examiner

Primary Examiner—Michael Safavi
(74) Attorney, Agent, or Firm—Phelps Dunbar, LLP

(57) ABSTRACT

Disclosed is an apparatus for pipeline stabilization and shoreline erosion protection, termed a BulkMat device, for protecting and securing pipelines, which are typically located in ditches or on the floor of large bodies of water. In preferred form, the BulkMat comprises a long fabric mat with four to eight fabric compartments sewn onto the mat and filled with dry bulk sand/cement mix. In the preferred embodiment, the BulkMat is comprised of polypropylene. The BulkMat has four lifting loops that are used to pick-up and lower the BulkMat onto the desired location. When the bulk mat is placed on the location, and water sets in, the sand/cement mix in the compartments will harden to concrete. By hardening after it is set in place, the BulkMat will conform completely to the pipeline or covered area to be protected, precisely matching the specific area.

10 Claims, 2 Drawing Sheets

APPARATUS FOR PIPELINE STABILIZATION AND SHORELINE EROSION PROTECTION

FIELD OF THE INVENTION

The present invention, the Apparatus for Pipeline Stabilization and Shoreline Erosion Protection (termed "BulkMat"), relates generally to protecting oil and gas pipelines, and to maintaining tension across the top of such pipelines. The invention can also add support to depressed areas of the ocean floor, and can be used to prevent erosion of shorelines.

BACKGROUND OF THE INVENTION

Offshore oil and gas pipelines leading from stationary marine structures to the shore are widely used, and they serve as vital links in the fuel production process, transporting fossil fuels from drill sites to production facilities. There are a vast number of offshore platforms, oil wells, and mining rigs, for example, located in coastal water oil fields throughout the world, and pipelines are used to deliver the oil and natural gas from these offshore platforms to holding tanks on land. Each time a pipeline crosses another pipeline a separation of the two must be maintained. The pipelines must also be stabilized in high-current areas, and all unburied pipelines must be protected from the possibility of impact damage. Also, there may be a need to add support to a depressed area in the sea floor before a pipeline or valve station is installed. The underwater valve stations and pipelines must be protected from trawling shrimp boat boards, etc. For convenience of maintenance and repair of the pipelines, the protective covering must sometimes be removed. Conventional methods of protecting the pipelines include concrete mats and burlap bags.

Concrete mats include a series of interconnected concrete hexagonal blocks connected together with polypropylene rope to form a concrete mattress. In essence, concrete mats are solid concrete blocks located within a rope-like netting. There are two different standard size concrete mats consisting of 160 block segments that are laced together with approximately 400' of polypropylene rope. The two standard sizes are 8'×20'×4½" and 8'×20'×9".

The larger size concrete mat (8'×20'×9") is used primarily on the ocean floor. The concrete mats, while jointed, due to the rope connections between concrete blocks, have an essentially rigid nature, and proper alignment during construction is critical. The 160 cement block segments become very heavy at 10,500 lbs. each and only 4 mats can be trucked at one time to it shipping location. The structure of the concrete mats also makes them very awkward to handle, requiring a heavy constructed lifting spreader bar with 20 slings pick-up to lift the concrete mat from the truck to the boat. This same lifting spreader bar is required offshore. The boat is limited on the number of mats it can carry due to these heavy weight items.

Offshore, the same hook-up is required to lift the concrete mat and lower it into the water. Divers are required to direct the lowering of the mat onto its destination. Once the concrete mat is properly aligned, the divers must unhook all 20 lifting slings. In low visibility dive conditions, occasionally divers will mistakenly leave one or more of the slings connected when the boat raises the spreader bar and the concrete mat will be pulled out of position, becoming useless so that it must be re-hooked and moved back to its correct location (with additional effort and safety concerns). Furthermore, ocean surges during deployment of the mat (which traps water in the mat, causing an up and down flexing of the mat while it is being lowered into the water, and which results in a rocking motion in the deploying boat), increase both the complexity and the danger associated with the deployment maneuver. This ocean surging effectively adds weight to the concrete mat and to the boat crane, and is very dangerous for the divers when a downward 8' ocean surge can bring a 10,500 lbs. concrete mat onto a diver in a split second. The complex installation issues involved with concrete mats have caused the diving industry to generally dislike them.

Burlaps bags are the oldest method of protecting pipelines used on the ocean floor. These 60 lbs. burlaps are filled with pure sand or sand/cement at a sand plant. The burlap bags are then typically stacked 56 bags per wooden pallet and shipped 14 or 15 pallets per truck. The pure sand or sand/cement burlap bags are lowered into the ocean by cargo nets and the divers place the burlaps into position. The difference between the two is that the pure sand does not harden, while the sand/cement turns into concrete after 4 hours. Both burlaps take's the shape of what they are settling on. Many times the burlaps are used with the concrete mats to form a better seal. The pure sand burlaps are required as a temporary installation while the sand/cement burlaps are on the permanent side. Both pure sand and sand/cement burlaps are more cost effective than the concrete mats, but are more labor intensive, requiring more time to position the individual bags. And while burlap bags with cement will harden to take the permanent shape of their area, they are more difficult to reapply in a manner which ensures a secure fit, due to their size and shape. Finally, burlap does not provide a durable covering, as it will decay over time. So, burlap bags are not recommended when permanence or removal is an important factor. The present invention of the BulkMat is intended to provide a simple and effective means to install pipeline protection of a more permanent nature, which conforms precisely to the shape of the area it is covering and holds the shape so that it may also be removed and reapplied again to ensure a secure fit.

SUMMARY OF THE INVENTION

The present invention addresses and overcomes problems encountered by both the concrete mat and burlap bag for helping diving companies, contractors and pipeline operators located on land and in large bodies of water protect pipelines. The BulkMat invention is especially superior in cost savings, flexibility, durability, and safety in the work place.

The BulkMat invention is generally comprised of a flexible container which is designed to hold some sort of weighted fill material. Typically, the flexible container has lifting loops incorporated into it, to facilitate movement and placement of the BulkMat, simplifying installation. Also, the flexible container is typically comprised of a fibrous material which allows water to permeate the flexible container when the flexible container is immersed (as when the flexible container is installed on the ocean floor, for instance). The flexible container is typically longer than it is wide, since this shape is more useful in a pipeline setting.

In order to have the necessary mass to securely anchor pipelines and to protect them from impact, the flexible container of the BulkMat is loaded with fill material, which acts to weigh the flexible container down. A variety of fill materials could be used, including sand, gravel, or pebbles.

The preferred fill material, however, is a dry bulk sand/cement mix, which will react with water to harden and form concrete.

In preferred form, the flexible container may be subdivided, as this results in a more even distribution of fill material across the BulkMat. Such a multi-compartment flexible container also has flexibility and handling advantages, specifically allowing for convenient loading of Bulk-Mats onto standard wooden pallets for transport by folding the BulkMat compartments atop one another in a stacking arrangement. So, preferably, the BulkMat invention comprises a 41" wide×14' long ultra violet polypropylene fabric mat with two lifting loops on each 14' end, several (4–8) 41"×20"×9" ultra violet polypropylene fabric compartments that are sewn onto the 14' mat, and dry bulk sand/cement mix which fills each compartment. The invention can then be folded and stacked 40"×48"×36" high onto a standard 40"×48" wooden pallet, with all four lifting loops on the same pallet side for lifting and setting onto the desired location. A forklift is all that is required to load and unload the pallets. A total of 14 to 16 pallets can be trucked at one time. The invention can be stacked two pallets high to save valuable cargo space. The invention size when it is lifted by the lifting loops is 41" wide×14' long×9" high and weighs approximately 3,200 lbs. Two slings on one end of a BulkMat, or four slings with or without a lifting spreader bar, can be used to lift the BulkMat. The BulkMats are safer to handle and help the contractor save time. When the BulkMats are placed on the location, and water sets in, the sand/cement in the compartments of the BulkMats will harden to concrete in approximately 4 hours or less. By hardening after it is set in place, the BulkMat will conform completely to the pipeline or the covered area to be protected. Thus, the BulkMat is flexible during installation, but provides a rigid form-fit which securely holds once in place. The BulkMat can be removed if access is needed at a later date. Neither the concrete in its solid form, nor the polypropylene fabric material is subject to degradation or deterioration, providing long-lasting protection. Also, because of its size, the fact that it molds to the area to be covered, and the presence of lifting loops, maintenance and repairs to pipelines are simplified, since it is easy to remove and then reposition the BulkMat properly.

It is an object of the BulkMat invention to secure pipelines in place on the floor of bodies of water. It is another object of this invention to protect pipelines from damage from impact by shielding the pipelines from direct contact with debris. It is still another object of this invention to protect the floor of bodies of water from erosion. It is yet another object of this invention to be convenient to transport and simple to install with a minimum of labor. It is yet another object of this invention to be flexible during installation, so that the BulkMat can precisely match the shape of the area it is covering, forming a secure fit. It is yet another object of this invention to permanently mold to take the shape of the area which it is covering, rigidly securing the precise shape at issue. It is yet another object of this invention to be easily removable, so that the protective covering can be removed for maintenance and repair and then reinstalled. It is yet another object of this invention to be durable and long-lasting, providing effective protection over an effective lifespan under the adverse conditions present in pipeline settings. These and other objects will be readily apparent to those skilled in the art field.

BRIEF DESCRIPTION OF DRAWINGS

Reference will be made to the drawings, where like parts are designated by like numerals and wherein.

DETAILED DESCRIPTION OF PREFERRED EMBODIMENT

Figure 4:
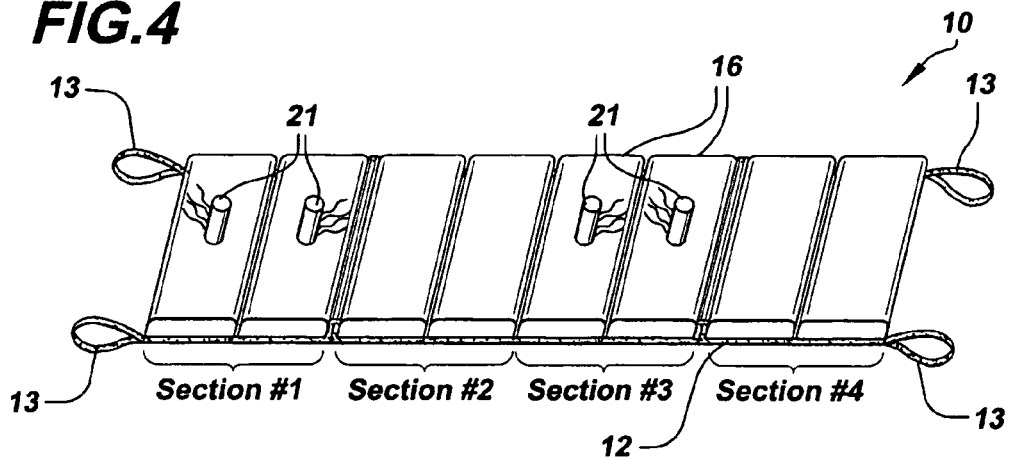
FIG. 4 is an isometric drawing of the preferred embodiment of the BulkMat.

Referring now to the drawings in more detail, the preferred embodiment of the BulkMat is shown in FIG. 4 and is generally designated by the numeral 10.

The BulkMat is generally comprised of a flexible container, typically rectangular in shape, which is designed to completely enclose fill material. The flexible container must be sufficiently strong to support the weight of the fill material it will hold. The flexible container typically must also be sufficiently durable and resistant to the degrading effects of seawater so that it will have a useful lifespan for protecting a pipeline. And while the container could be made of rigid materials and made flexible by incorporating flexible joints between rigid sections, creating a segmented, shell-like container, more typically, the container is constructed of a flexible material which flexes and conforms as needed, such that the entire BulkMat 10 is flexible and completely capable of conforming to the area it covers. Preferably, the flexible container is comprised of a fibrous material which allows water to permeate the flexible container when the flexible container is immersed. Preferably, the flexible container also includes some means for lifting the BulkMat 10 (such as lifting loops 13, for example) incorporated into the flexible container, in order to facilitate movement and placement of the BulkMat 10 during installation.

In order for the BulkMat 10 to function effectively to secure and/or protect pipelines in place on the ocean floor, the flexible container described generally above must be filled with some sort of weighted fill material. The fill material provides the necessary mass to securely anchor the pipelines in place and to protect them from impact. A wide variety of fill materials could be used, including sand, gravel, pebbles, or a dry bulk sand/cement mix. While larger plates or blocks of metal, concrete, or rock (anything more dense than water, ensuring that the BulkMat 10 will stay submerged beneath the water's surface once positioned) could also be used as fill material, simply serving to add weight to the BulkMat 10, a fill material which is capable of flowing is preferable, since such fill material used in conjunction with a flexible container will conform to take the shape of the area being covered, essentially molding to the area and thereby providing better protection. Preferably, the fill material would not react adversely with water, so that the BulkMat 10 is durable.

The flexible container may also be subdivided into several compartments, each of which may be loaded with fill material. The benefit of a flexible container subdivided into several compartments is that the fill material is kept more evenly distributed throughout the BulkMat 10 during transport; the amount of shifting of fill material is limited by the partitions. Such a multi-compartment flexible container may also have flexibility and handling advantages, since the compartments may be spaced to essentially provide for an additional joint of flexible movement for the loaded Bulk-Mat 10 containers. These benefits will be described in more detail below for the preferred embodiment.

Figure 1:
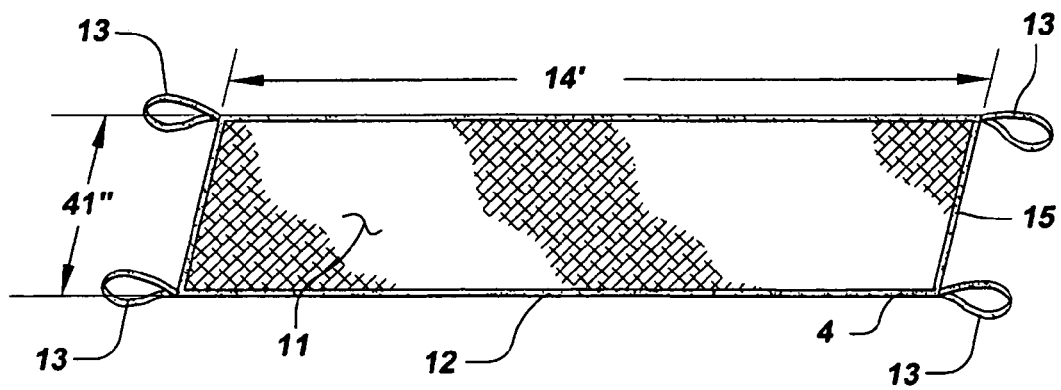
FIG. 1 is an isometric drawing of the fabric mat of the preferred embodiment of the BulkMat.
Figure 2:
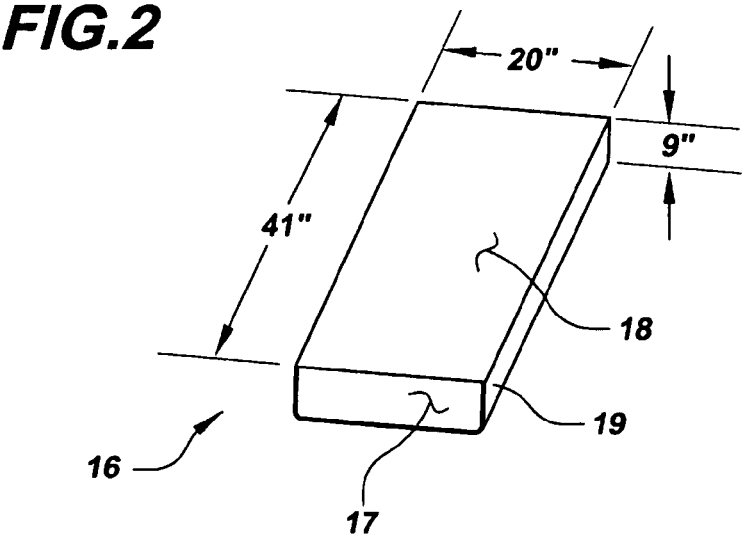
FIG. 2 is an isometric drawing of one of the fabric compartments of the preferred embodiment of the BulkMat, which are rigidly attached in place on the fabric mat of FIG. 1.
Figure 3:
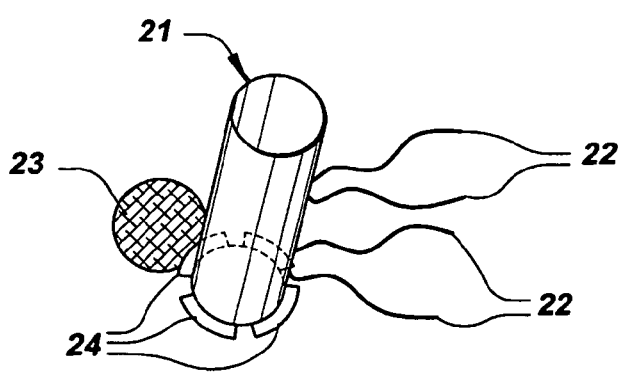
FIG. 3 is an isometric drawing of one of the fill spout/closures of the preferred embodiment of the BulkMat.

In the preferred embodiment of the BulkMat, shown in FIG. 4, the flexible container is comprised of a fabric mat 11 and several compartment bags 16 which are securely attached to the fabric mat 11. The fabric mat 11 of the preferred embodiment is shown in additional detail in FIG. 1. In the preferred embodiment, the fabric mat 11 is comprised of a rectangular piece of 8.5 oz. 400 lbs. tensile strength ultra violet resistance polypropylene, typically 41 inch wide×14 feet long. Two 8,000 lbs. tensile strength continuous polyester 2" wide webbing straps 12 are sewn on both sides of the 14 foot lengths, circling back to form four 10 inch lifting loops 13 on the ends and sewn back into the webbing a minimum of 25 inches. Two 2,500 lbs. tensile strength continuous polyester 1½" wide webbing safety straps 15 may also be sewn on both sides of the 41 inch lengths, providing additional reinforcement. The webbing is sewn with 6000 denier boxing polypropylene thread and the hemming is sewn with 1000 denier polypropylene thread in the preferred embodiment. Obviously, sewing is only one possible means for attaching, and other such means, such as staples and an adhesive, would also work equally well and are included within the scope of this invention.

Figure 5:
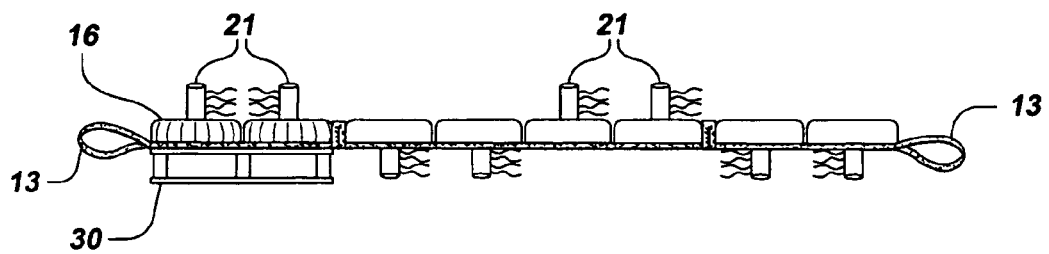
FIGS. 5–8 are isometric drawings showing the loading of fill material into the preferred embodiment of the BulkMat for transport.
Figure 6:
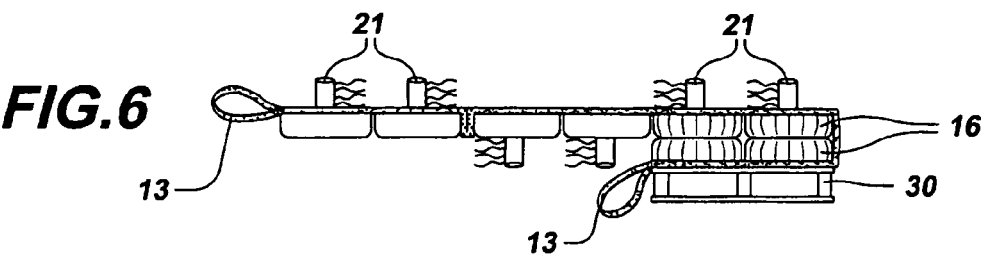
Figure 7:
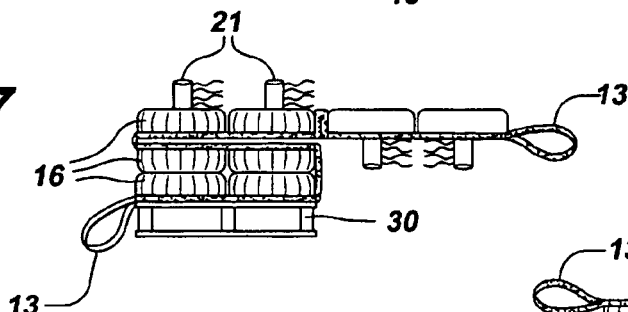
Figure 8:
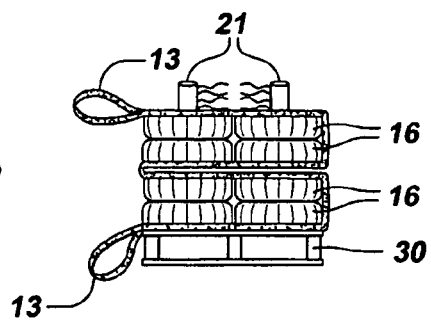

In the preferred embodiment, several compartment bags 16 are securely attached atop the fabric mat 11 in order to form the integrated flexible container. The preferred embodiment uses eight 41 inch×20 inch×9 inch high compartment bags 16, fabricated with 8.5 oz. 400 lbs. tensile strength ultra violet resistance polypropylene fabric. Each compartment bag 16 is assembled together by sewing a bottom "U" shape fabric 17, a top fabric sheet 18 and two side fabric panels 19 together. All material and hemming are sewn with 1000 denier polypropylene thread. Thus, each compartment bag 16 forms a full enclosure with a top, a bottom, and sidewalls, designed to hold fill material securely within the recess of the compartment bag 16. Some means of access for loading fill material into the recess of the compartment bags 16 must also be provided, and the means of access must also provide a means of closure, so that the fill material will remain within the recess of the compartment bags 16 once it has been loaded. In the preferred embodiment, eight 8 inch diameter×11 inch long fill tube spouts 21 fabricated with 3 oz. ultra violet resistance polypropylene fabric with ½" 260 lbs. tensile strength polypropylene ties 22 are provided, so that fill material may be poured into the recess of the compartment bags 16. The fill spouts 21 are sewn to the eight compartment bags 16. Although the fill spouts 21 may be located at various positions on the compartment bags 16, in the preferred embodiment four fill spouts 21 are sewn onto the center top fabric sheet 18 of four alternating compartment bags 16 and four fill spouts 21 are sewn onto the center bottom "U" shape fabric 17 of the remaining four alternating fill bags (as is shown in FIG. 5), as this aids in the preferred loading procedure. The top 18 and bottom 17 polypropylene fabric is cut to the same diameter as the fill spouts 21 and folded back into four sections 24. The fabric four sections 24 are then sewn with the fill spouts 21 to form a four star closure 24. A ½" 260 lbs. tensile strength polypropylene tie 22 is installed to the four star closures 24. An 8 inch diameter 3 oz. ultra violet resistance polypropylene fabric closure flap 23 is sewn to one of the four star folded section 24 of each compartment bag 16. All material is sewn with 1000 denier polypropylene thread.

In the preferred embodiment, the eight compartment bags 16 are sewn with 6000 denier boxing polypropylene thread down both sides of the 8,000 lbs. webbing straps 12 along the 14 foot polypropylene fabric mat 11. The four compartment bags 16 with the fill spouts 21 on top are placed in sections #1 and #3 while the four compartment bags 16 with the fill spouts 21 on bottom are placed in sections #2 and #4 (see FIGS. 4 and 5). The polypropylene fabric mat 11 that touches sections #2 & #4 four compartment bag's 16 fill spouts 21 are cut to the same 8" diameter as the fill spouts 21. Although it is not necessary for the BulkMat 10 to function, preferably, the compartments bags 16 are spaced apart a sufficient distance so that the BulkMat 10 may be folded for loading upon a standard wooden pallet 30 (as is shown in FIGS. 5–8); in the preferred embodiment, all compartment bags 16 are spaced approximately 1" apart. Between sections #1 & #2 and #3 & #4, the fabric mat is sewn along both compartment bags 9" sides and spaced 1" apart at the top of the compartment bags.

In the preferred embodiment, the fill material is a concrete mix, typically 3 parts sand to 1 part Portland cement. It might also be possible to add fibrous elements into the cement mix, to provide additional tensile strength to the formed concrete once it hardens. While other fill materials would function, the use of dry bulk sand/cement mix improves the operation of the BulkMat 10 in the preferred embodiment water-permeable flexible fabric container since, as the BulkMat 10 is positioned on pipelines under water, the sand/cement mix will react with the water which enters the flexible container to harden and form concrete. This provides a hard, durable, and strong form of protection for the pipeline, and molds the BulkMat 10 permanently into the shape of the area being covered, supporting the area and allowing the BulkMat 10 to be removed and replaced while retaining a secure fit.

The preferred embodiment of the BulkMat 10 is approximately 41" wide×14'long×9" high. Each of the compartment bags 16 are approximately 41"×20"×9" high. While other sizes and shapes would function effectively, this size and the rectangular shape has proven particularly useful for underwater pipeline protection in the coastal water settings of the Gulf of Mexico. It should also be understood that other materials may be effectively used for the flexible container and for the fill material, and that the preferred materials presented herein are merely illustrative examples and are not meant to be limiting in any way. For example, polyester, rayon, nylon, cotton, or burlap could also be used to construct the flexible container, although polyester would not be preferred because it interacts with concrete, rayon and nylon would not be preferred because they tend to stretch (so a container made of these materials would not hold its shape), and cotton and burlap would not be preferred because they tend to degrade. Furthermore, the preferred means for attaching compartment bags 16 to the mat 11 or for attaching the lifting loops 13 to the mat 11, namely sewing, is also merely illustrative. Persons skilled in the art field will recognize and appreciate equivalents, which are also intended to be included within the scope of this invention.

While several procedures could be employed for filling and deploying the BulkMat 10, FIGS. 5–8 illustrate the preferred method for filling the BulkMat 10 in its preferred embodiment, so that it can easily be transported and deployed. The preferred method for filling the compartment bags 16 of the BulkMat 10 at a sand plant with dry bulk sand/cement mix is as follows:

1. (FIG. 5) Section #1 two compartment bags 16 are laid across a wooden pallet 30 and filled through the 8" fill spout openings 21. The fill spouts 21 and star closer flaps 23 are closed and tied shut with the polypropylene ties 22.
2. (FIG. 6) Section #2 two compartment bags 16 are folded on top of the filled section #1 compartment bags 16 and are filled through the 8" fill spout openings 21. The fill spouts 21 and star closer flaps 23 are closed and tied.
3. (FIG. 7) Section #3 two compartment bags 16 are folded on top of the filled section #2 compartment bags 16 and are filled the same as the other sections. The fill spouts 21 and star closer flaps 23 are closed and tied.
4. (FIG. 8) Section #4 two compartment bags 16 are folded on top of the filled section #3 compartment bags 16 and are filled the same as the other sections. The fill spouts 21 and star closer flaps 23 are closed and tied. All four sections of eight compartment bags 16 are all filled with dry sand/cement mix and stacked onto a wooden pallet 30 with the four lifting loops 13 on the same side. The BulkMat 10 can now be wrapped with two layers of polyethylene to keep the material dry in storage and during trucking.

This preferred method allows for quick and efficient loading of the fill material into the BulkMat 10, while simultaneously loading the BulkMat 10 onto a pallet 30, so that it can be readily transported for deployment. Also, the manner of folding of the BulkMat 10 allows for simple unloading and positioning of the BulkMat 10 onto underwater pipeline locations, using either two slings on one end of the BulkMat 10 or four slings with or without a lifting spreader bar for a crane to pick up and move the BulkMat into position.

The principles, drawings and methods of operation of the present invention have been described in the specifications. The invention is not to be construed as limited to the particular forms and specific preferred embodiments disclosed, because they are regarded as illustrative rather than restrictive. A person skilled in the art field will understand and appreciate additional embodiments and uses, which are also included within the scope of the present invention. Moreover, variations and changes may be made without departing from the spirit of the invention. For example, some BulkMats 10 will be half the size of the preferred embodiment, utilizing only sections #1 & #2 with a space of 1" or more between the two sections. The scope of the invention is more fully defined in the following claims, and the only limits to the scope of the invention are those set forth within the claims below.

What I claim is:

1. A device comprising:
a flexible container comprising a mat, a means for lifting, and a plurality of compartment bags, wherein said plurality of compartment bags are attached to said mat, and said means for lifting is attached either to said mat or to one or more of said plurality of compartment bags; said compartment bags positioned on said mat in relation to one another to facilitate folding of said flexible container so that said compartment bags may be placed in a stacking arrangement;
weighted fill material; wherein said fill material is enclosed within said flexible container; said fill material further comprising dry sand/cement mix;
each of said compartment bags further comprising a means of access and closure; and
wherein the location of said means of access alternates in a pattern along the length of said flexible container from the top of said compartment bags to the bottom of said compartment bags in order to facilitate filling of said compartment bags while said compartment bags are being stackably folded.

2. A device as in claim 1 wherein said mat and said compartment bags are comprised of polypropylene.

3. A device comprising:
a flexible container comprising a means for lifting said device comprising two lifting loops; and a plurality of compartment bags comprised of polypropylene, attached together to form a single, unitary flexible container with a plurality of subdivided compartments, said compartment bags positioned in relation to one another to facilitate folding of said flexible container so that said compartment bags may be placed in a stacking arrangement, each of said compartment bags containing a means of access and closure, wherein the location of said means of access alternates in a pattern along the length of said flexible container from the top of said compartment bags to the bottom of said compartment bags in order to facilitate filling of said compartment bags while said compartment bags are being stackably folded; said means for lifting attached to one or more of said plurality of compartment bags; and
weighted fill material comprised of dry sand/cement mix wherein said fill material is enclosed within said flexible container.

4. A device comprising:
a mat;
a plurality of compartment bags attached to said mat and positioned on said mat in relation to one another to facilitate folding of said mat so that said compartment bags may be placed in a stacking arrangement;
a plurality of lifting loops attached to said mat;
wherein each of said compartment bags further comprises a means of access and closure;
and wherein the location of said means of access alternates in a pattern along the length of said mat from the top of said compartment bags to the bottom of said compartment bags in order to facilitate filling of said compartment bags while said compartment bags are being stackably folded.

5. A device as in claim 4 further comprising a pallet and dry fill material, wherein each of said plurality of compartment bags are filled with said fill material as said compartment bags are loaded onto said pallet in a stacking arrangement.

6. A device as in claim 4 wherein said means of access and closure further comprises a four star closure fill spout.

7. A device as in claim 6 wherein said mat and said plurality of compartment bags are comprised of polypropylene.

8. A device as in claim 4 further comprising dry fill material, and wherein said mat and said plurality of compartment bags are comprised of a water permeable fibrous material.

9. A device as in claim 8 wherein said fill material further comprises sand/cement mix.

10. A device as in claim 7 further comprising fill material, wherein said fill material further comprises a dry bulk concrete mix, approximately 3 parts sand to 1 part cement.

* * * * *